United States Patent [19]

Oettinger

[11] 4,348,765
[45] Sep. 7, 1982

[54] THERMIONIC LASER

[75] Inventor: Peter E. Oettinger, Acton, Mass.

[73] Assignee: Thermo Electron Corporation, Waltham, Mass.

[21] Appl. No.: 124,394

[22] Filed: Feb. 25, 1980

[51] Int. Cl.$^3$ ................................................ H01S 3/09
[52] U.S. Cl. ......................................... 372/78; 372/69
[58] Field of Search ...................... 331/94.5 G, 94.5 P, 331/94.5 H, 94.5 C, 94.5 D

[56] References Cited

U.S. PATENT DOCUMENTS

| | | | |
|---|---|---|---|
| 3,831,107 | 8/1974 | Karras | 331/94.5 |
| 3,882,416 | 5/1975 | Borghi et al. | 331/94.5 G |
| 3,886,483 | 5/1975 | Miley | 331/94.5 P |
| 4,122,411 | 10/1978 | Fein et al. | 331/94.5 G |

OTHER PUBLICATIONS

"A Laser Excited by Nuclear Heat", by Johnson, *Nucleonics*, vol. 22, No. 4, Apr. 1964.
"Thermionic Energy Conversion Research Analysis", by Lawless et al., *1977-1978 Annular Progress Report*, DOE Contract E (11-1)-2533.
"Recombination Lasers in Nd and $CO_2$ Laser-Producer Cadmium Plasmas", by Silfuast et al., *Optics Letters*, vol. 4, No. 9, Sep. 1979.

*Primary Examiner*—William L. Sikes
*Assistant Examiner*—Léon Scott, Jr.
*Attorney, Agent, or Firm*—Herbert E. Messenger; James L. Neal

[57] ABSTRACT

A thermally pumped laser. The laser features an emitter, a collector spaced apart from the emitter, and reflecting elements adjacent to the space between the emitter and collector to form a cavity. A heat source is provided for heating the emitter to drive electrons from the emitter to the collector. Vapor such as cesium vapor is disposed in the cavity between the emitter and the collector to form the lasing medium. An additive selected to be in resonance with specific excited states of the atoms may be intermixed with the chosen vapor. The additive assists in depopulating the specific states of the atoms, thereby creating or enhancing a population inversion in the atoms of the vapor so that lasing may occur. The laser may be operated both in a pulsed and in a d.c. mode.

10 Claims, 3 Drawing Figures

THERMIONIC LASER

BACKGROUND OF THE INVENTION

This invention relates to lasers and more particularly to thermally driven lasers employing thermionic processes.

Lasing in a material depends on the formation of population inversions between specific atomic or molecular states. That is, laser activity, the production of coherent radiation, becomes possible when the number of atoms or molecules in excited states exceeds the number in lower states. Such a condition is known as a population inversion. An atom is said to be in an excited state when one or more of its electrons has been elevated to an energy level above the lowest state. Transitions of electrons from excited states to lower states result in the emission of photons of electromagnetic radiation. In a laser, the emission of a photon from a transition within a single atom stimulates transitions in other excited atoms so that the photons which they emit are in phase, thereby generating a laser's characteristic coherent radiation.

In order to create the population inversions, energy must be added to excite or "pump" the lasing material to a higher energy state. It is known to pump lasing materials with electrical, optical, chemical or nuclear energy sources. These methods of laser pumping, however, are both complex and energy inefficient. For example, the efficiency of a gas laser excited by radio frequency electromagnetic energy has an efficiency of approximately 0.1%.

It has therefore been of prime interest to develop a laser which may be pumped by thermal energy alone, generated, for example, from the combustion of fuels or from nuclear or solar energy. Such a laser would be particularly useful in situations where a suitable source of thermal energy is available. One such application is solar or nuclear powered optical inter-satellite communications networks. Other applications suited to thermally pumped lasers include the rapid switching of high electrical powers, radioactive isotope separation, ultra-sensitive pollution detection, accurate monitoring of industrial processes and the chemical analysis of trace elements. In addition, thermally pumped lasers would deliver substantially higher energy efficiencies than optically or electrically pumped lasers and would require no input other than thermal energy. The higher conversion efficiencies result from the fact that thermal energy is used directly rather than being converted first to electricity for electrical discharge excitation of a lasing medium, or further converted to light suited for optically exciting a lasing medium.

Although the desirability of thermally pumped lasers has been long recognized, their development has been frustrated because high translational temperatures, which are a measure of the degree of motion of the atoms or molecules in the lasing medium, tend to destroy the population inversions before lasing can occur. This is so because the energetic collisions among the constituents tend to bring the medium into thermal equilibrium. It is known from Boltzmann's law that thermal equilibrium at any temperature requires that a state with a lower energy be more densely populated than a state with a higher energy. Thus, thermal equilibrium is inconsistent with population inversions required for laser activity.

It is an object of the present invention therefore to provide a laser pumped by thermal energy alone.

It is another object to provide such a laser which operates both in a pulsed and in a d.c. mode.

SUMMARY OF THE INVENTION

The present invention is based on the discovery that thermally driven lasers are feasible if thermionic processes are used to generate the necessary population inversions so that electron transitions from higher to lower states may occur to generate coherent radiation. In thermionic energy conversion, heat is transformed directly into electrical power by driving off electrons from a metallic emitter heated typically to 1600°–1800° K. These electrons then pass through a low pressure gas or vapor such as cesium, prior to condensing onto a cooler metallic collector separated from the emitter by a distance of about 0.5 to 2 millimeters and maintained at a temperature typically in the range of 600°–800° K. The voltage across the emitter and collector is low, on the order of a few tenths of a volt. The current available from a thermionic converter, however, is high. The high current is dependent upon the presence of the low pressure cesium vapor. If, for example, a vacuum were maintained between emitter and collector, as electrons were driven from the emitter into the inter-electrode space, their presence would create a negative space charge which would then repel subsequent electrons coming from the emitter. However, with cesium vapor present, the electrons coming from the emitter ionize some of the cesium atoms to create positive ions in the inter-electrode region. These positive ions tend to neutralize the space charge to permit an easier passage for the emitted electrons, resulting in the high currents typical of thermionic converters. Electron emission from the emitter may sometimes be enhanced by supplementing the cesium vapor with small quantities of oxygen, barium, or strontium.

In addition to ionizing some of the cesium atoms, the flow of electrons from emitter to collector serves to pump or excite the cesium atom's bound electrons into higher energy states. It should be noted that competing processes are involved. Collisions of the cesium atoms and ions with the hot electrode surfaces and among themselves thermally equilibrate the translational energies of these heavy species at temperatures ranging from that of the emitter to that of the collector. Such thermal equilibrium, however, implies that more atoms will be in lower energy states than in higher states. The flow of electrons through the vapor, on the other hand, tends to excite the bound cesium electrons into higher energy states to create a population of excited cesium atoms. Some of these atoms will be ionized thereby providing additional free electrons. The overall process of electrons being ejected from a hot emitter, accelerating into and partially ionizing the cesium vapor, traversing a narrow interelectrode plasma, and finally being captured by a cooler collector generates electromotive forces in these interelectrode regions which result in the thermal equilibration of the free electrons at a temperature substantially above the translational temperature of the heavy species. The combination of accelerated energetic electrons from the emitter, equilibrated hot plasma electrons, and cooler atoms and ions produces a distortion in the normal Boltzmann distribution of atom populations in excited energy states. Although this distortion suffices, in pulsed operation of the electron emission, to generate population inversions in between the pulses, it has not, so far, been observed to provide inversions in d.c. operation. However, if to the cesium there are added atoms whose excited state populations are only weakly affected by the electromotive forces in the plasma, and which contain states in resonance with lower lying cesium levels, then the population inversion needed for lasing in d.c. operation can be established by energy flowing from the cesium atoms into the atoms of the additive, thereby depopulating specific lower cesium states.

As stated above, the creation of a population inversion is a necessary condition for laser action. For coherent radiation actually to be generated, however, requires an optical cavity formed by a fully reflecting element separated from and parallel to a partially reflecting element with the lasing medium such a cesium vapor in between. As stated before, the transition of a single electron to a lower energy state emits a photon. This photon in turn stimulates similar transitions in other excited atoms to generate other photons in phase with the first. These photons are reflected back and forth between the fully and partially reflecting elements to stimulate coherent photon emission from still further electron transitions. A fraction of the photons so generated will pass through the partially reflecting element forming a beam of coherent radiation.

According to a preferred embodiment of the invention disclosed herein a thermally driven laser operable in the d.c. mode comprises an emitter and a collector spaced apart from the emitter. A heat source is provided for heating the emitter to drive electrons from the emitter toward the collector thereby producing an electrical current. A fully reflecting element such as a mirror is disposed on one side and adjacent to the region separating the emitter and collector. A partially reflecting element serving as an output coupler is disposed on the other side of this region and opposite to the fully reflecting element, the combination of the fully reflecting element and the partially reflecting element creating an optical cavity therebetween. A vapor such as cesium vapor is maintained in the optical cavity between the emitter and the collector and an additive is intermixed with the cesium vapor. The additive is selected to be minimally affected by the interelectrode electromotive forces and to be in resonance with specific lower energy states of cesium vapor so as to depopulate these states to create a population inversion in the atoms of the cesium vapor. One preferred additive is nitrogen. A suitable emitter material is tungsten and a suitable collector material is nickel. The fully reflecting element of this embodiment may be a mirror or a diffraction grating. The partially reflecting element forming the output coupler is a partially silvered mirror.

In another embodiment of the invention for use in a pulsed mode, electrical power conditioning and pulsing circuitry are provided for operating on the current flowing between an emitter and collector of a thermionic laser. The power conditioning and pulsing circuitry apply higher voltage pulses across the emitter and collector and the vapor such as cesium vapor maintained between them. Although additives are not required to produce population inversions in the vapor during pulsed mode operation of this embodiment of the thermionic laser, an additive such as helium or nitrogen may be mixed with the cesium vapor to enhance such inversions.

DESCRIPTION OF THE PREFERRED EMBODIMENTS

Figure 1:
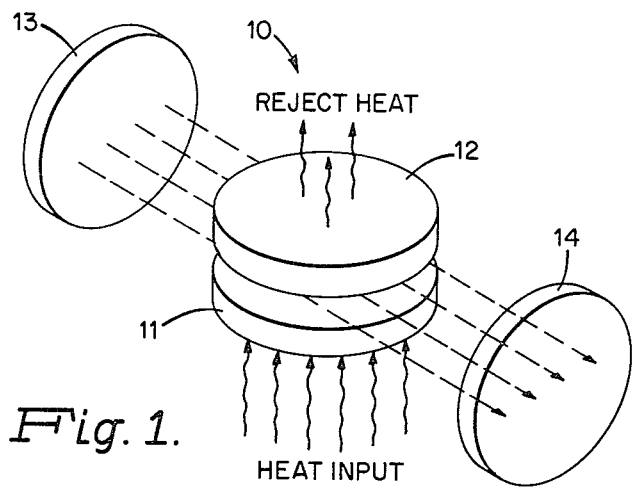
FIG. 1 is a schematic representation of an embodiment of the laser disclosed herein employing a planar emitter and collector.

With reference first to FIG. 1 a thermally driven laser 10 operable in the d.c. mode features a planar emitter 11 and a planar collector 12 spaced apart from the emitter 11. A suitable material for the emitter 11 is tungsten and a suitable material for the collector 12 is nickel. Disposed between the emitter 11 and the collector 12 is a vapor such as cesium vapor at low pressures, e.g. pressures in the range from 0.05 to 5 millimeters of mercury. Cesium is the preferred vapor atom because it is the most easily ionized, naturally occurring element and requires only 1.38 electron volts of energy for excitation to its first level above the ground state. Other readily ionizable atoms which may also provide suitable vapors for thermionic lasing are the alkalis, rubidium, potassium, sodium, and lithium, and the alkaline earth barium.

To achieve the population inversions required for lasing in the d.c. mode, an additive such as molecular nitrogen gas is added to the cesium vapor. In order to provide significant depopulation of a resonant cesium energy level the ratio of pressures of nitrogen to cesium vapor should be of the order of one or greater. Also, a fully reflecting mirror 13 is disposed adjacent to the region between emitter and collector, and a partially reflecting mirror 14 forming an output coupler is disposed opposite the mirror 13 thereby forming an optical cavity suitable for lasing. A diffraction grating may be used as the fully reflecting element if desired.

In operation of the thermally driven laser 10, thermal energy from a heat source such as a nuclear reactor or a fuel combustor heats the emitter 11 to a high temperature in the range of 1600°–1800° K. At this temperature electrons are driven from the emitter 11 and some of these electrons ionize cesium atoms in the vapor between the emitter and the collector to form positive ions. The collector 12 is maintained at a temperature in the range of 600°–800° K. The emitter 11 and the collector 12 are closely spaced in the range of 0.5–2 millimeters which spacing restricts the heating by the electrons of the atoms and ions in the cavity between the emitter 11 and the collector 12. Collisions of the atoms and ions with the cooler electrode surfaces, in addition to collisions of these heavy species with the lighter electrons, inhibit the medium's reaching thermal equilibrium. The electromotive force generated in the narrow region between the emitter 11 and the collector 12 of the thermally driven laser 10 produces a plasma having a larger population of excited atoms than would be the case of a plasma in thermal equilibrium at the translational temperature of the atoms. Such a nonequilibrated plasma is well suited to the creation of population inversions so that lasing may result. To create these population inversions, an additive such as nitrogen is intermixed with the cesium vapor. The nitrogen resonates with the lower excited states of the cesium atoms so that energy flows from these lower cesium states into the nitrogen thereby depopulating the lower cesium excited states. The nitrogen molecules release this additional energy to the electrodes either by direct collisions with the electrode surfaces or via intermediate collisions with molecules, atoms, and ions. Such a depopulation of the lower states of cesium in combination with the substantial population of excited states of this atom creates the population inversion in cesium atoms necessary for lasing to occur. The fully reflecting mirror 13 and the partially reflecting mirror 14 form an optical cavity suitable for generating coherent radiation. The thermally driven laser 10 will generate such coherent radiation in the mid-infrared region (1-30 micrometers).

Figure 2:
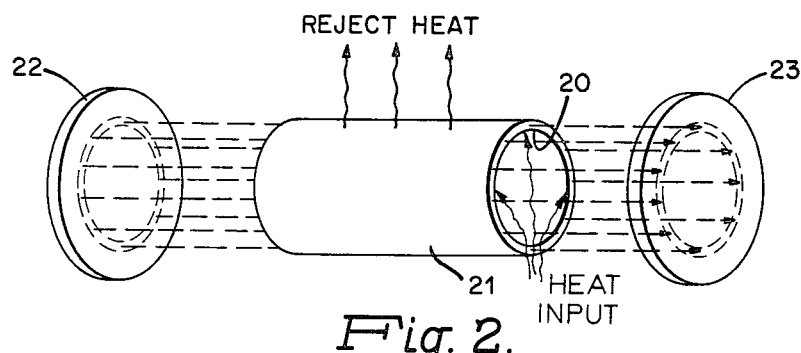
FIG. 2 is an embodiment of the laser disclosed herein employing a cylindrical collector and emitter.

Another embodiment of this invention is shown in FIG. 2. In this embodiment an emitter 20 and a collector 21 are concentric cylinders separated by 0.5-2 millimeters. A vapor such as cesium vapor and an additive such as nitrogen are maintained in the gap between the emitter 20 and the collector 21. As in the embodiment of FIG. 1, the emitter 20 is heated to a temperature in the range of 1600°-1800° K. while the collector 21 is maintained at a temperature in the range of 600°-800° K. A fully reflecting mirror 22 and a partially reflecting mirror 23 forming an output coupler create the optical cavity necessary for lasing. Suitable cesium and additive pressures are as specified in conjunction with the embodiment of FIG. 1.

Figure 3:
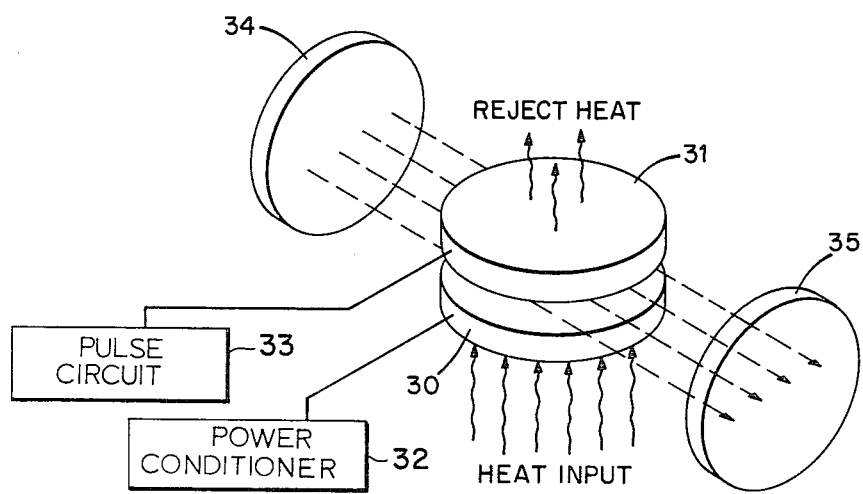
FIG. 3 is a schematic representation of an embodiment of the invention suitable for operation in a pulsed mode.

The embodiment of the invention shown in FIG. 3 is adapted for use in a pulsed mode. As in the embodiment of FIG. 1, an emitter 30 is heated to 1600°-1800° K. causing electrons to flow toward a collector 31 maintained at a lower temperature of 600°-800° K. A power conditioner 32 and a pulse circuit 33 are connected across the emitter 30 and the collector 31. The power conditioner 32 increases the voltage across the emitter 30 and the collector 31. The pulse circuit 33 is adapted to apply electrical pulses such as pulses in the range of 10-100 volts across the emitter 30 and the collector 31 at a frequency of up to approximately 1 kilohertz. A suitable power conditioner 32 and pulse circuit 33 is an Oppen transformer circuit (see Oppen, W. R., Term. Conv. Spec. Conf. Proc., Gatlinburg, Tenn., p. 372, Oct. 1963, whose disclosure is incorporated herein by reference thereto).

In the pulsed mode laser illustrated in FIG. 3, as in the d.c. mode lasers described above, a fully reflecting mirror 34 and a partially reflecting mirror 35 form the optical cavity necessary for lasing, and a 0.5-2 millimeter gap between the emitter 30 and the collector 31 is filled with a vapor such as low pressure cesium vapor. For operation in the pulsed mode it is not necessary that there be an additive present. This is so because at the end of a pulse, the lower cesium states depopulate more rapidly than the more highly excited cesium states. The highly excited states depopulate more slowly because of de-excitation limiting, or "bottleneck", transition rates. An additive such as helium or nitrogen may, however, be mixed with the cesium in order to enhance a population inversion by further depopulating lower lying states in cesium atoms.

It should be noted that the resonance between cesium and helium, although very good, does not involve the ground state of helium. This characteristic limits the usefulness of helium in low voltage d.c. operation, but is not a limiting factor with respect to the use of helium in the higher voltage pulsed mode operation.

Thus there has been disclosed a thermally driven laser which requires no energy input other than heat energy. The laser disclosed can be used in both a pulsed and in a d.c. mode.

While the laser disclosed herein has been described with respect to its preferred embodiments it is to be understood that modifications and variations will occur to those skilled in the art. It is intended that all such variations and modifications be included within the appended claims.

What is claimed is:

1. A thermally driven laser operable in the d.c. mode comprising:
    (1) an emitter for emitting electrons;
    (2) a collector spaced apart from said emitter and defining a region therebetween, said collector operable to collect electrons emitted by said emitter;
    (3) a fully reflecting element disposed adjacent to the region separating said emitter and said collector;
    (4) a partially reflecting element disposed adjacent to said region separating said emitter and said collector and opposite to said fully reflecting element, said fully reflecting element and said partially reflecting element defining therebetween an optical cavity suitable for lasing;
    (5) a vapor disposed in said optical cavity between said emitter and said collector, said vapor being a vapor of an element selected from the group consisting of cesium, rubidium, potassium, sodium, lithium, barium, and mixtures thereof;
    (6) an additive intermixed with said vapor to form therewith a lasing material, said additive consisting of atoms or molecules whose excited state populations are minimally affected by electromotive forces between said emitter and said collector, said atoms or molecules having excited states in resonance with specific lower energy states of said vapor so as to depopulate said specific lower energy states thereby to produce a population inversion in the atoms of said vapor; and
    (7) a heat source for providing thermal energy to pump said lasing material, said heat source operable to drive electrons from said emitter toward said collector, thereby generating a current.

2. The laser according to claim 1 wherein said vapor is cesium vapor.

3. The laser according to claim 1 wherein said additive is nitrogen.

4. The laser according to claim 3 wherein said vapor is cesium vapor and the ratio of partial pressures of nitrogen to cesium is at least one.

5. The laser according to claim 1 wherein said fully reflecting element is a mirror.

6. The laser according to claim 1 wherein said fully reflecting element is a diffraction grating.

7. A thermally driven laser operable in the pulsed mode comprising:
    (1) an emitter for emitting electrons;
    (2) a collector spaced apart from said emitter and defining a region therebetween, said collector operable to collect electrons emitted by said emitter;
    (3) a fully reflecting element disposed adjacent to the region separating said emitter and said collector;
    (4) a partially reflecting element disposed adjacent to said region separating said emitter and said collector and opposite to said fully reflecting element, said fully reflecting element and said partially reflecting element defining therebetween an optical cavity suitable for lasing;

(5) a vapor disposed in said optical cavity between said emitter and said collector, said vapor being a vapor of an element selected from the group consisting of cesium, rubidium, potassium, sodium, lithium, barium, and mixtures thereof;

(6) a transformer circuit connected across said emitter and said collector, said transformer circuit including a power conditioner for increasing the voltage across said emitter and said collector and a pulsing circuit for applying electrical pulses across said emitter and said collector to produce a population inversion in the atoms of said vapor;

(7) an additive intermixed with said vapor to form a lasing material, said additive consisting of atoms or molecules whose excited state populations are minimally affected by electromotive forces between said emitter and said collector, said atoms or molecules having excited states in resonance with specific lower energy states of said vapor so as to depopulate said specific lower energy states thereby to enhance said population inversion in the atoms of said vapor; and (8) a heat source for providing thermal energy to pump said lasing material, said heat source operable to drive electrons from said emitter toward said collector, thereby generating a current.

8. The laser according to claim 7 wherein said vapor is cesium vapor.

9. The laser according to claim 7 wherein said additive is nitrogen.

10. The laser according to claim 7 wherein said additive is helium.

* * * * *